May 24, 1949.  A. G. PARKER  2,471,283
AIRCRAFT CONTROL SYSTEM
Filed July 16, 1945  4 Sheets-Sheet 1

INVENTOR
A.G. PARKER
BY Featherstonhaugh & Co.
ATTORNEYS

INVENTOR
A. G. PARKER
ATTORNEYS

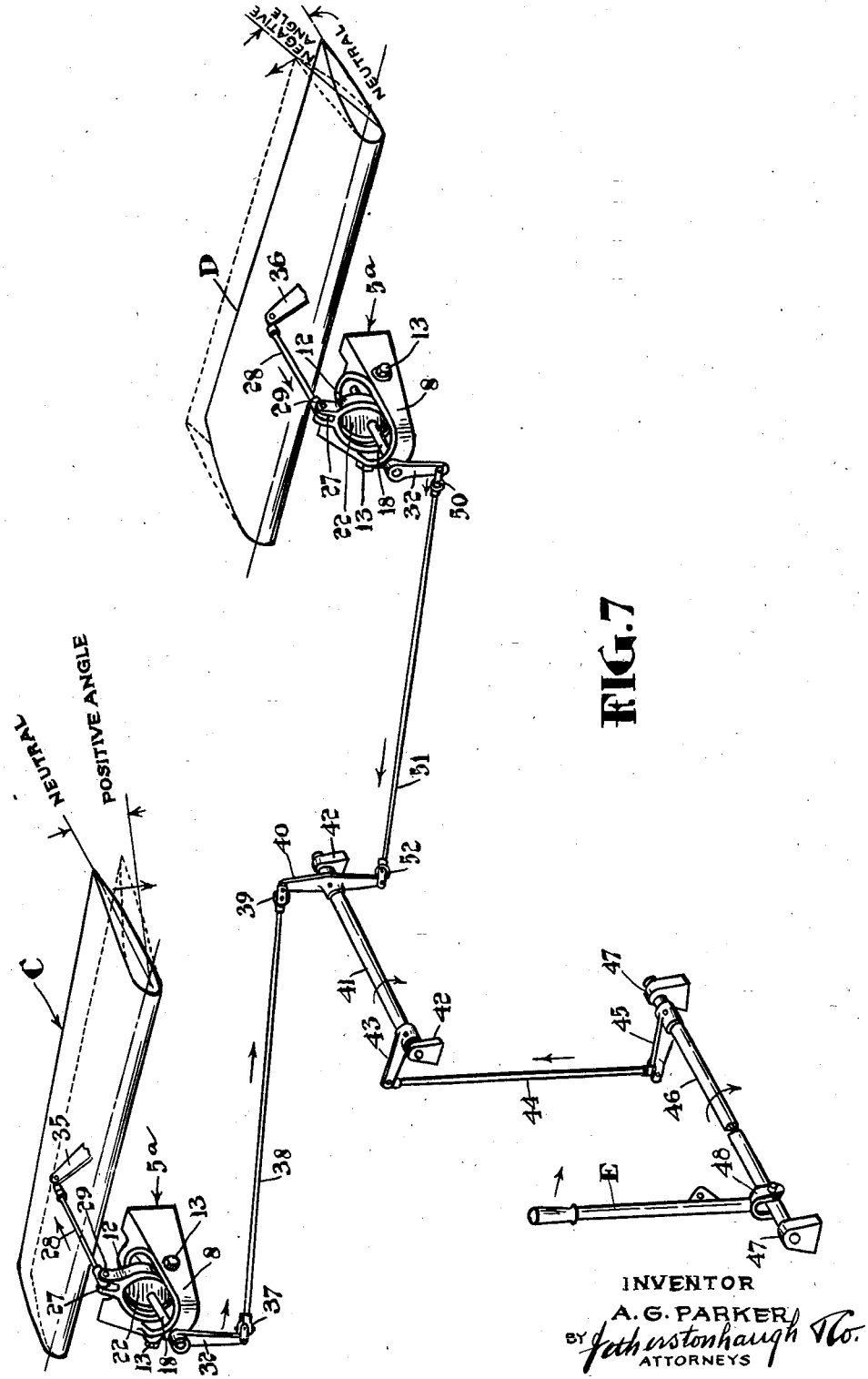

May 24, 1949.  A. G. PARKER  2,471,283
AIRCRAFT CONTROL SYSTEM
Filed July 16, 1945  4 Sheets-Sheet 4
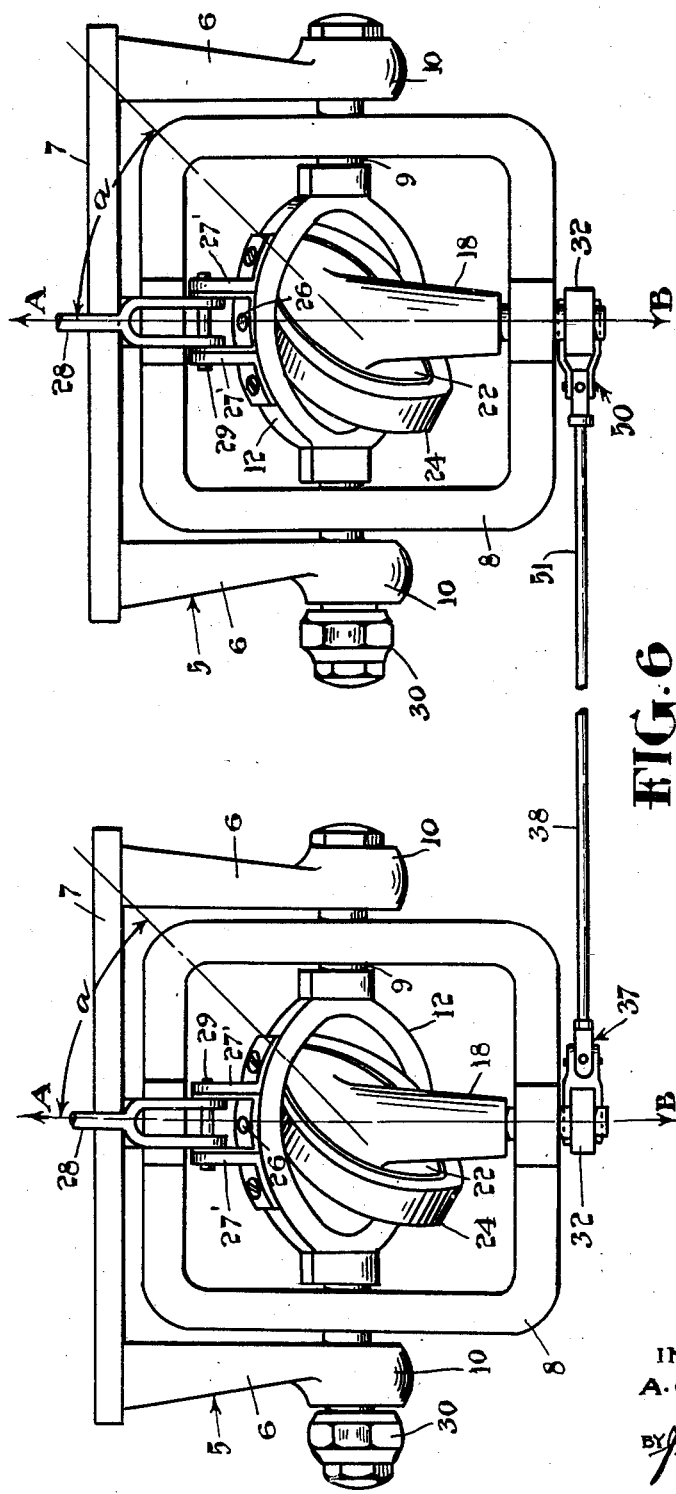
INVENTOR
A. G. PARKER
ATTORNEYS Patented May 24, 1949

2,471,283

UNITED STATES PATENT OFFICE 2,471,283

AIRCRAFT CONTROL SYSTEM

Arnold G. Parker, Longueuil, Quebec, Canada

Application July 16, 1945, Serial No. 605,310

6 Claims. (Cl. 244—83)

This invention relates to aircraft and the object is to provide a generally improved aircraft control system in which motion is transmitted to ailerons or other controls through the agency of two coordinated motion-transmitting units of the swash plate type described in my co-pending United States application Serial No. 605,309, filed July 16, 1945, now Patent No. 2,438,182, issued on March 23, 1948.

In the above mentioned application I have described a motion-transmitting unit comprising a primary member supporting a secondary member consisting of an inclined disc carried by a shaft having its ends rotatably journalled in bearings afforded by the primary member. The disk carrying shaft extends through a yoke ring which is pivotally supported by the primary member for swinging movement about an axis passing transversely through said shaft. The peripheral portion of the inclined disk is constituted by a strap ring mounted on an anti-friction bearing which holds the strap ring and the disc in co-planar relation. The strap ring is provided, at diametrically opposite points, with trunnions which are journalled in the yoke ring so that the strap ring is held against rotation with the disc but serves as a coupling through which the wobbling motion of the disc during rotation of the shaft is transmitted to the yoke ring to oscillate the latter about its pivotal axis. This oscillating movement of the yoke ring is utilized to impart linear or reciprocating movement to a rod or other driven element connected therewith.

A further important feature of the unit described in said application in that the primary member in which the disc-carrying shaft is journalled is movably mounted for oscillation about an axis coinciding with the pivotal axis of the yoke ring. This arrangement enables the shaft, disc and yoke ring to be tilted as a unit about the common pivotal axis of the yoke ring and the primary member by imparting oscillating movement to said ring. This, in turn, enables reciprocating or linear movement to be imparted to the yoke-actuated rod or other driven element by (a) oscillating the disc-carrying shaft about its central longitudinal axis or (b) oscillating the primary member to effect unitary tilting of the shaft, disc and yoke ring about an axis extending transversely through said shaft.

The present invention is based on the discovery that the above mentioned and other characteristics of the motion-transmitting unit described in said application enables it to be paired and coordinated with a similar unit to provide an ideal motion-transmitting mechanism for inclusion in an aircraft control system to operate ailerons, drooping ailerons used as a high lift device or other aircraft controls. It may be stated, however, that when motion-transmitting units of the type described in said application are employed for the purpose of the present invention it is not absolutely necessary, in all cases, that the primary member in which the disc-carrying shaft is journalled be mounted for oscillating movement. In some cases it has been found possible to provide a satisfactory aircraft control system in which the primary members of the two coordinated motion-transmitting units are fixed in position so that the yoke rings are actuated solely by rotary oscillation of the associated disc-carrying shafts. In other instances of aircraft control systems embodying said unit it is important that the primary members of the units be mounted for oscillating movement as described in said application.

Proceeding now to a more detailed description of this invention reference will be had to the accompanying drawings, in which—

Fig. 1 is a diagrammatic perspective view of an aircraft control system in which my improved motion-transmitting units are included to control the action of the starboard and port ailerons. In this particular control system each of the motion-transmitting units is of the type in which the primary member is mounted for oscillating movement about an axis passing transversely through the disc-carrying shaft journalled in said member.

Fig. 4 is a sectional view showing the mounting and assembly of the disc-carrying shaft, the inclined disc mounted thereon and the cooperating disc actuated yoke ring.

Fig. 6 is a diagrammatic view showing a slight modification in which the relative setting of the component parts of each unit in the neutral position of the unit is such that the aileron raising motion of each unit is greater than its aileron lowering motion thereby enabling a desirable differential action to be obtained in the operation of the ailerons by said units.

Fig. 7 is a view similar to Fig. 1 but showing a slight modification in which the primary member of each unit is fixed in position so that the yoke ring of said unit operates solely in response to rotary movement of the shaft carrying the inclined yoke operating disc.

In describing the drawings in detail reference will be had initially to Figs. 1 to 5 inclusive.

Figure 1:
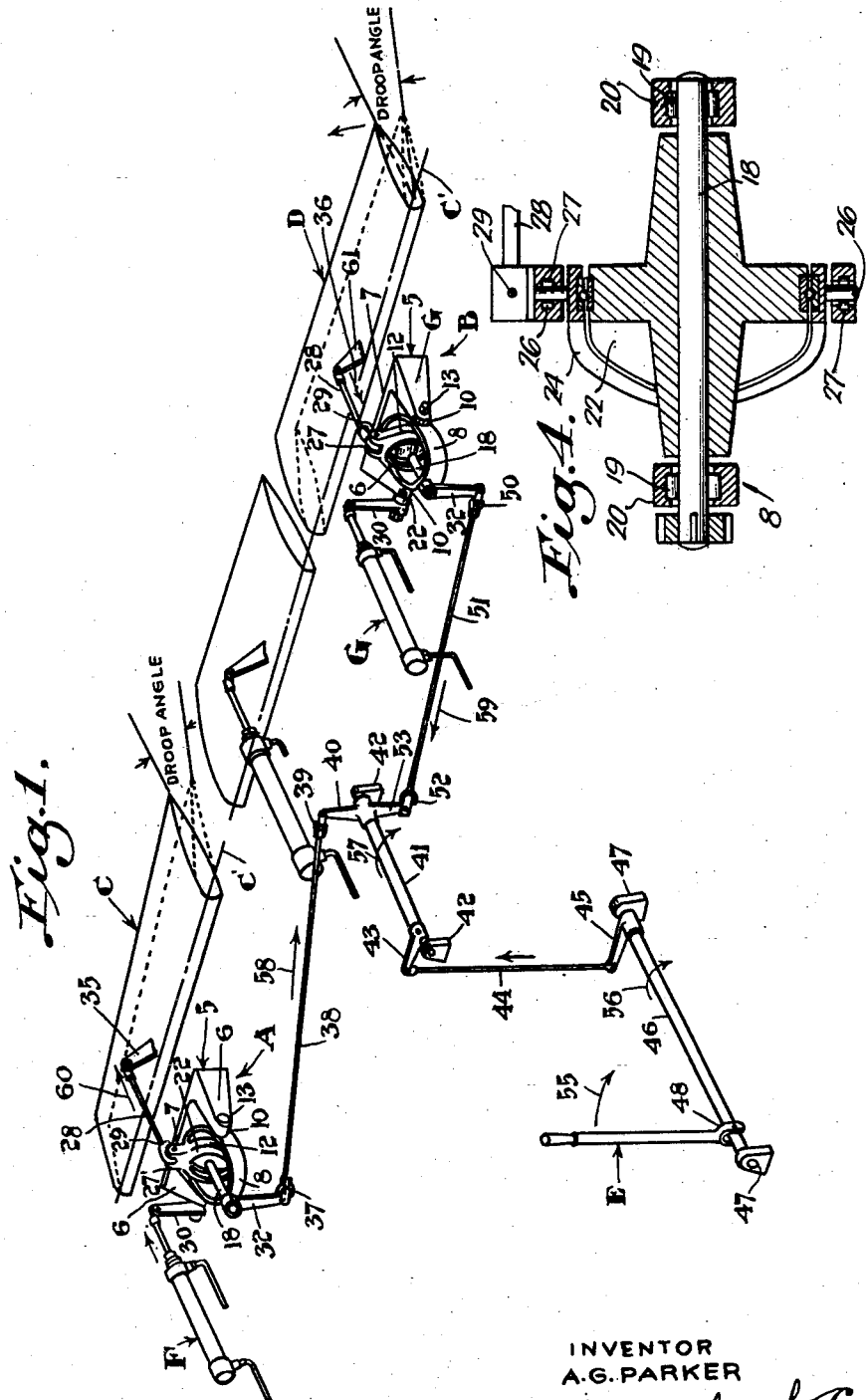

In the general arrangement shown in Fig. 1, two duplicate motion-transmitting units A and B are employed for operating the starboard and port ailerons C and D in response to lateral movement of the pilot's control stick E, or in response to simultaneous operation of two pilot-controlled cylinder and piston devices F and G.

Each of the motion-transmitting units A and B is a substantial duplicate of that described in my aforesaid co-pending application. As shown more clearly in Figs. 2 to 5 inclusive, it comprises a bracket 5 including parallel arms 6 projecting from a base plate 7. An open frame member 8, hereinafter refered to as the primary member of the motion-transmitting unit, is equipped with hollow trunnions 9 (see Fig. 5) rigidly secured thereto and extending outwardly through bearing housings 10 provided at the free ends of bracket arms 6. Trunnions 9 are preferably journalled in bearing housings 10 by suitable anti-friction bearings 11. Primary member 8 is thus mounted to oscillate about the axis C—D. A yoke ring 12 is also mounted to oscillate about axis C—D by two supporting shafts 13 extending inwardly through the hollow trunnions 9 as clearly shown in Fig. 5.

Shafts 13 are fixed to rotate with trunnions 9 by threaded connections 14 or any other suitable means. The inner ends of shafts 13 extend into bearing housings 15 carried by opposite sides of yoke ring 12 and are journaled in anti-friction bearings 16.

A shaft 18 extends through yoke ring 12 at right angles thereto with end portions thereof journalled in anti-friction bearings 19 contained in bearing housings 20 afforded by diametrically opposite portions of primary member 8. It will thus be seen that shaft 18 is journalled to rotate about the axis A—B which intersects axis C—D at right angles and is co-planar therewith. Shaft 18 carries a swash-plate or wobbler disc 22 which is obliquely inclined with reference to axis A—B. A strap ring 24 encircles the periphery of disc 22 and is mounted thereon by an annular anti-friction bearing 25 (Fig. 4) which retains the strap ring and disc in co-planar relation. Strap ring 24 carries diametrically opposite trunnions 26 which lie on a common axis at right angles to the yoke-supporting shafts 13 and are journalled in bearings 27 carried by yoke ring 12. The yoke ring 12 is also provided with ears 27' to which one end of an aileron operating rod 28 is secured by a pivot pin 29.

Shaft 18, disc 22 and disc-encircling strap ring 24 conjointly constitute which is hereinafter termed the secondary member of the motion-transmitting unit.

One trunnion 9 of primary member 8 is extended beyond its bearing housing 10 and equipped with an operating lever 30 which is operated, as hereinafter described, to oscillate primary member 8 about axis C—D and thereby effect tilting movement of the secondary member comprising shaft 18, disc 22 and strap ring 24 about the same axis. Owing to the trunnion connection between yoke ring 12 and disc-encircling strap ring 24 it will be obvious that bodily tilting movement of disc 22 about axis C—D will result in oscillating movement of yoke ring 12 about the same axis and thereby effect linear or reciprocating movement of the aileron actuating rod 28.

One end of shaft 18 is also extended beyond the adjacent bearing housing 20 and equipped with an operating lever 32 which is connected as hereinafter described to oscillate shaft 18 about the axis A—B. This rotary oscillation of shaft 18 about axis A—B serves, through the agency of inclined disc 22 and strap ring 24, to oscillate yoke ring 12 about axis C—D and thereby impart linear or reciprocating movement to the rod 28.

From the foregoing it will be seen that linear motion may be imparted to the aileron operating rod 28 of each motion-transmitting unit by (a) turning shaft 18 in either direction about axis A—B or (b) tilting primary member 8 and shaft 18 in either direction about the axis C—D. It will also be apparent that these movements of shaft 18 about axes A—B and C—D may be performed successively in any desired sequence or may be performed simultaneously.

Figure 2:
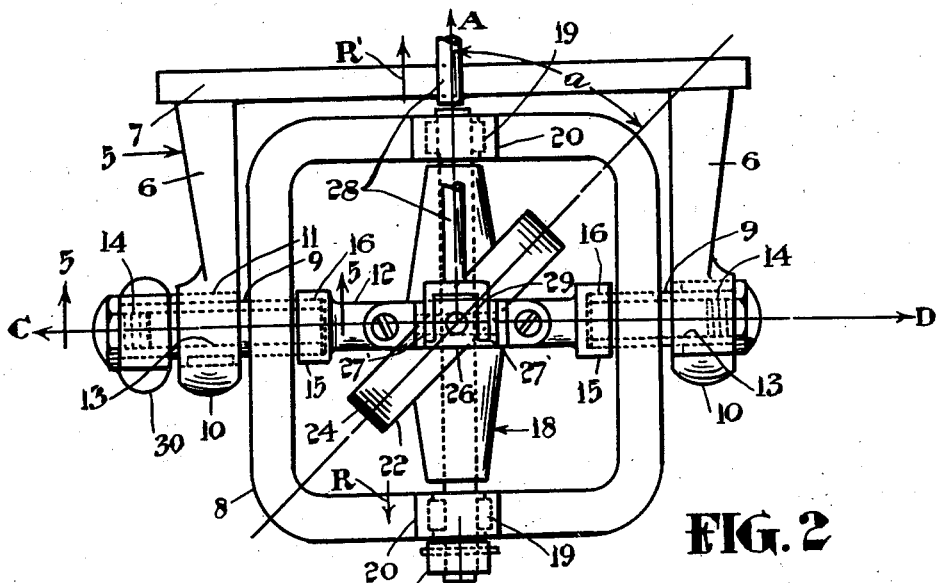
Fig. 2 is a top plan view of one of the motion-transmitting units shown in Fig. 1. In this view the operating parts are shown in what is termed the neutral position.
Figure 3:
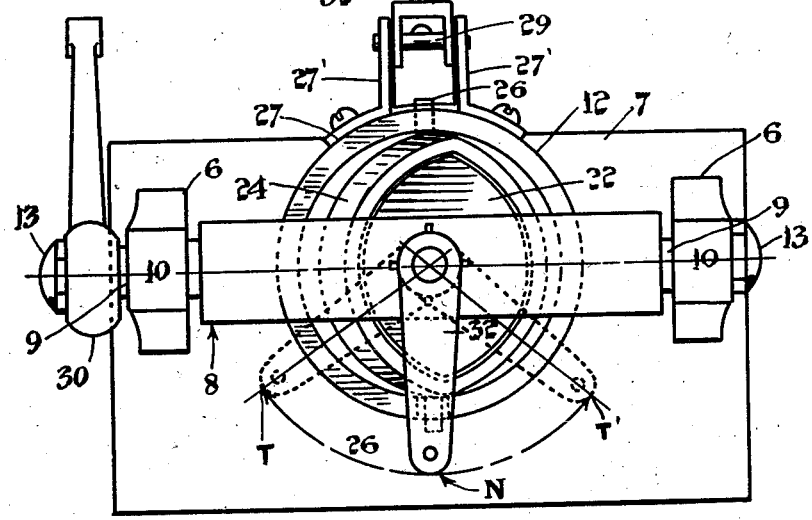
Fig. 3 is a front view of the assembly shown in Fig. 2.
Figure 5:
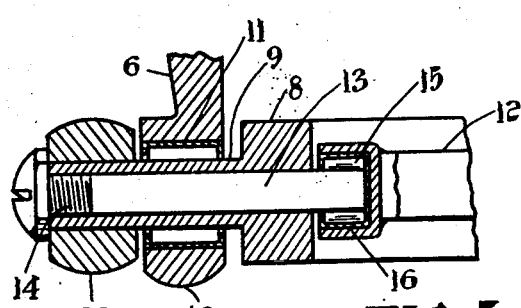
Fig. 5 is a sectional view taken substantially along the line 5—5 of Fig. 2 and shows the manner in which the primary member and yoke ring are mounted to swing about a common axis transverse to the axis of rotation of the disc-carrying shaft.

The motion-transmitting units A and B employed in the arrangement shown in Fig. 1 are designed so that, in the neutral position thereof, the operating parts of each unit will be arranged as shown in Figs. 2 and 3. In this neutral condition of each unit the primary member 8 lies in a horizontal plane, the yoke 12 lies in a vertical plane perpendicular to the plane of the primary member and the disc 22, as viewed in Fig. 2, extends obliquely across axis A—B at an angle a determined by design requirements. The trunnions 26 are positioned directly above and below the intersection of the axes A—B and C—D.

The relative angular setting of disc 22 and lever 32 on shaft 18 of each unit is such that, in the neutral condition of the unit, lever 32 extends downwardly from shaft 18 as shown by full lines in Fig. 2. In the present instance the lever 30, which operates primary member 8 of each unit, is also shown fixed to its trunnion 9 so that it extends upwardly from the trunnion in the neutral condition of the unit.

Lever 32 is connected, as hereinafter described, so that it may be swung upwardly from its neutral position N through a predetermined angle to either of the predetermined aileron operating positions T or T' indicated by dotted lines in Fig. 3. When lever 32 is swung to the left from neutral position N toward position T the aileron operating rod 28 is moved in the aileron raising direction indicated by the arrow R.

When lever 32 of each unit is moved from the neutral position N toward position T' the aileron operating rod 28 is shifted in the aileron lowering direction indicated by arrow R'.

The angle through which primary member 8 of each unit may be oscillated about axis C—D through the agency of lever 30 and its operating mechanism is a variable factor.

The magnitude of the angular motion imparted to the yoke ring 12 of each unit by rotation of disc 22 is governed by the angle at which the disc is set in relation to its axis and this angle may be varied for different applications.

Owing to the angular arrangement of disc 22 on shaft 18 the movement of yoke 12 proceeds at varying velocity in response to constant velocity movement of lever 32.

From the foregoing it will be seen that, in the specific arrangement shown in Figs. 1 to 5 inclusive, the angular motion imparted to yoke 12 of each unit in response to movement of lever 32 from neutral position to position T is equal to the reverse angular motion imparted to said yoke by movement of lever 32 from neutral position N to position T'. This is so because, in the neutral position of lever 32 and disc 22, yoke 12 of each unit lies in the neutral vertical position shown in Fig. 1 and the yoke-actuating trunnions 26 are positioned directly above and below the intersection of axes A—B and C—D.

Reverting again to the general arrangement shown in Fig. 1, it will be noted that the aileron operating rod 28 of unit A is pivotally connected to an arm 35 projecting upwardly from the starboard aileron C and that the aileron operating rod 28 of unit B is similarly connected to an arm 36 projecting upwardly from the port aileron D. The two ailerons are pivoted in conventional manner to the starboard and port wings (not shown) so that each aileron is mounted to swing vertically about a pivotal axis C'. It has not been thought necessary to show the mounting of the brackets 5 of the two motion-transmitting units but it will be understood that these brackets may be attached to the wing spars or any other suitable supporting structure.

The lever 32 of unit A is connected, through universal joint 37, rod 38 and universal joint 39, to a crank arm 40 fixed to a torsion shaft 41 journalled in suitable bearings 42. Shaft 41 is connected, through crank arm 43, rod 44 and crank arm 45, to a second torsion shaft 46 journalled in bearings 47. The pilot controlled stick E is secured to torsion shaft 46 by a universal joint 48 so that lateral movement of the control stick results in rotary movement of the torsion shafts 46 and 41 in a direction dependent upon the direction of movement of the control stick. The lever 32 of unit B is connected, through universal joint 50, rod 51 and universal joint 52 and crank arm 53, to torsion shaft 41.

Assuming that control stick E is moved laterally to port as indicated by arrow 55, the torsion shafts 46 and 41 will be rotated in the direction indicated by the arrows 56 and 57 and the rods 38 and 51 will be moved as indicated by the arrows 58 and 59. This will result in the disc carrying shafts of the two motion-transmitting units being rotated so that the aileron operating rod 28 of unit A will be moved in the aileron lowering direction indicated by the arrow 60 while the aileron operating rod 28 of unit B will be moved in the aileron raising direction indicated by the arrow 61, the extent of aileron movement in each case being dependent upon the extent of the lateral movement imparted to the pilot's control stick E. In the present instance it will be assumed that the permissible range of lateral movement of the pilot's control stick E is such as to enable the lever 32 of each unit to be moved to either of the previously mentioned positions T and T'. From the foregoing it will be seen that, in response to lateral movement of the pilot's control stick E in either direction, one of the ailerons will be lowered and the other simultaneously raised to control the aircraft about its longitudinal axis and that the direction of movement imparted to each aileron is dependent upon the direction of movement of the pilot's control stick.

Conditions arise where it is desirable to provide means whereby both ailerons may be drooped or returned to neutral simultaneously without interfering with the ability of the pilot to operate the ailerons in opposite directions to give lateral control. According to the present invention this is provided for by connecting the aforesaid cylinder and piston device F to the lever 30 of unit A and connecting the aforesaid cylinder and piston device G to the lever 30 of unit B. These cylinder and piston devices F and G are operated simultaneously by any suitable pilot controlled valves or other operating mechanism so that they serve to simultaneously swing the primary members 8 of the units A and B about their respective axes C and D to thereby effect simultaneous operation of the two ailerons to any desired position of adjustment.

The cylinder and piston devices F and G are shown merely by way of example since the levers 30 of units A and B may be simultaneously operated by variable types of pilot controlled operating mechanism.

In the operation of ailerons, it is usually desirable that the aileron operating mechanism be designed so that the lowering motion imparted to each aileron is less than the raising motion for reasons which are well understood in the art. This differential operation of the aileron is not provided for in the arrangement shown in Figs. 1 to 7 inclusive, since in that case the yoke 12 of each unit has the same range of movement in either direction from its neutral position. However, this differential operation of the ailerons may be easily accomplished in accordance with the present invention by initially assembling the component parts of the two units, so that, when the levers 32 are in the neutral position N (Fig. 3) the discs 22 will be in the position shown in Fig. 6 and the yokes 12 will lie in positions inclining forwardly from the neutral position shown in Fig. 1. In this latter case the magnitude of the angular motion of each yoke 12 in the aileron lowering direction will be less than the magnitude of the angular motion in the aileron raising direction.

The arrangement shown in Fig. 7 is substantially the same as that shown in Fig. 1, except that the primary member 8 of each unit is fixed in position, being formed as a rigid or integral part of a bracket 5a which replaces the previously mentioned bracket 5. In this case the shafts 13 supporting the yoke 12 are stationary shafts extending inwardly through opposite sides of the stationary member 8. As will be readily understood the yokes 12 shown in Fig. 7 operate solely in response to rotation of the disc carrying shaft 18 since no provision is made for tilting the shaft 18 and the primary members 8 about the previously mentioned axis C—D.

Having thus described my invention, what I claim is:

1. In an aircraft control system, the combination with a movable control element of means for operating said element including a motion transmitting unit comprising a rotary shaft, an inclined disc carried by and rotatable with said shaft, a yoke through which said shaft extends, means mounting said yoke for swinging movement about an axis passing transversely through said shaft, means interconnecting said disc and yoke so that swinging movement is imparted to the yoke by rotary movement of the shaft and disc through a predetermined angle in either direction from a neutral position, means interconnecting the yoke and the control element so that the latter is caused to operate in response to swinging movement of the yoke, and means for tilting said shaft and disc about a transverse axis coinciding with the aforesaid axis about which the yoke is swingable.

2. In an aircraft control system, the combination with a pivotally mounted aileron of operating means for swinging said aileron to different positions of adjustment, said operating means including a motion transmitting unit comprising a shaft supporting member and a yoke mounted for independent swinging movement relative to each other about a common fixed axis, a shaft extending through the yoke and having its ends rotatably journalled in bearings carried by the shaft supporting member, a disc carried by and rotatable with said shaft, said disc being obliquely inclined with respect to the central axis of said shaft, means for turning said shaft through a predetermined angle in either direction, means for swinging said shaft supporting member through a predetermined angle in either direction to thereby tilt said shaft and disc about the common axis of the shaft supporting member and yoke, means interconnecting the disc and yoke so that the yoke is swung about its fixed axis in response to rotation of the shaft in either direction about its central longitudinal axis, or swinging movement of the shaft supporting member and shaft in either direction about the fixed axis of the shaft supporting member, and means interconnecting said yoke and aileron so that swinging movement is imparted to the aileron in response to swinging movement of the yoke.

3. In an aircraft control system, the combination with a pair of control elements mounted for swinging movement of means for operating said elements including a separate motion transmitting unit associated with and operatively connected to each of said control elements, each of said units comprising a shaft, means for rotating said shaft through a predetermined angle in either direction from a neutral position to a predetermined travel position comprising an inclined disc carried by said shaft, a yoke through which said shaft extends, means mounting said yoke for swinging movement about an axis passing transversely through said shaft, means interconnecting said yoke and disc so that swinging movement is imparted to the yoke by rotary movement of said shaft and motion transmitting means through which the swinging movement of the yoke is transmitted to the associated control element, said system being further characterized in that the cooperating disc and yoke of each unit are relatively arranged so that the motion imparted to the associated control element by rotation of the shaft to one of its predetermined travel positions is less than the motion imparted to said control element by rotation of said shaft to its other predetermined travel position.

4. In an aircraft control system, the combination with a plurality of movable control elements of means for operating said elements including a plurality of motion transmitting units, each associated with and operatively connected to one of said control elements, each of said units comprising a tiltable shaft supporting member mounted to tilt about a fixed axis, a shaft journalled in bearings carried by said shaft supporting member so that said shaft is rotatable about a central longitudinal axis at right angles to the tilt axis of the shaft supporting member, an inclined disc carried by said shaft, a yoke through which said shaft extends, means mounting said yoke for swinging movement about an axis coinciding with the axis about which the shaft supporting member is tiltable, means interconnecting said yoke and disc so that swinging movement is imparted to the yoke by rotary movement of said shaft or by tilting movement of the shaft resulting from tilting movement of the shaft supporting member, means for simultaneously rotating the disc-carrying shafts of said units through a predetermined angle in either direction from a neutral to a predetermined travel position and means for simultaneously tilting the shaft supporting members of said units in either direction through a predetermined angle about their aforesaid axes to thereby effect tilting movement of the disc carrying shaft and the inclined disc of each unit and means connecting the yoke of each unit to the associated control element so that the latter is operable in response to swinging movement of the yoke resulting from either rotary or tilting movement of the shaft and the disc operatively connected to said yoke.

5. An aircraft control system as set forth in claim 1 in which the relative setting of the disc and yoke in the neutral positioning thereof is such that the magnitude of the angular motion imparted to the yoke when the disc is rotated through a predetermined angle in one direction is greater than the magnitude of the angular motion imparted to the yoke when the disc is rotated through an equal angle in the opposite direction.

6. In an aircraft control system, the combination with a plurality of movable control elements of means for operating said elements including a separate motion transmitting unit operatively connected to each of said elements, each of said units comprising a shaft, means for rotating said shaft about its central longitudinal axis, means for tilting said shaft about a transverse axis and motion transmitting means interconnecting each shaft with its associated control element so that motion is imparted to the control element by either rotary or tilting movement of said shaft, said motion transmitting means comprising an inclined disc carried by and rotatable with said shaft, a yoke through which said shaft extends, means interconnecting the inclined disc and yoke, means mounting said yoke for swinging movement about said transverse axis and a motion transmitting member connecting said yoke to the associated control element.

ARNOLD G. PARKER.

REFERENCES CITED

The following references are of record in the file of this patent:

UNITED STATES PATENTS

| Number | Name | Date |
|---|---|---|
| 1,061,917 | Maltener | May 13, 1913 |
| 1,627,004 | Albessard | May 3, 1937 |
| 2,153,667 | Hoekstra | Apr. 11, 1939 |
| 2,383,845 | Couzinet | Aug. 28, 1945 |

FOREIGN PATENTS

| Number | Country | Date |
|---|---|---|
| 530,697 | Germany | Sept. 14, 1927 |
| 852,599 | France | Oct. 30, 1939 |